United States Patent
Sampatacos

[11] 3,838,899
[45] Oct. 1, 1974

[54] AXIALLY PRELOADED BEARING ASSEMBLY

[75] Inventor: Peter M. Sampatacos, Port Clinton, Ohio

[73] Assignee: General Motors Corporation, Detroit, Mich.

[22] Filed: July 27, 1973

[21] Appl. No.: 383,083

[52] U.S. Cl............................................ 308/189 A
[51] Int. Cl. ........................................... F16c 35/06
[58] Field of Search..................... 308/189 A, 207 A

[56] References Cited
UNITED STATES PATENTS
2,521,638    9/1950    Lamm.................................. 308/184

*Primary Examiner*—Manuel A. Antonakas
*Assistant Examiner*—Frank Susko
*Attorney, Agent, or Firm*—F. J. Fodale

[57] ABSTRACT

An automotive waterpump subassembly comprises a sheet metal housing rotatably supporting an impeller drive shaft by a pair of ball bearing complements located in a sealed chamber in the housing. The outer raceway for one of the ball complements is supported on a sheet metal wall plate which is located in the middle of the housing and which is resiliently deflected to axially preload the bearing complements. A sheet metal end plate carries a ceramic face seal element which engages a carbon face seal element carried by the impeller shaft. The wall plate and end plate form a chamber which is divided into three compartments by a S-shaped baffle mounted on the impeller drive shaft. The drive shaft is hollow and closed at the impeller end by a sheet metal impeller. A radial passage in the hollow drive shaft is aligned with the interface of the face seal element and provides a drainage path directly from the outer compartment to atmosphere through the hollow drive shaft for water leaking past the face seal. A drainage hole in the housing communicates directly with the intermediate compartment providing a second drainage path for water before it can reach the inner compartment. The bearings are further sealed from the inner compartment.

4 Claims, 3 Drawing Figures

PATENTED OCT 1 1974

3,838,899

AXIALLY PRELOADED BEARING ASSEMBLY

This invention relates generally to bearing assemblies and more specifically to bearing assemblies comprising two ball complements which are preloaded with opposing thrust components.

Several arrangements for such bearing assemblies are shown in the U.S. Pat. No. 2,521,638 issued to A. K. Lamm on Sept. 5, 1950 entitled "Mounting for Antifriction Bearings". As illustrated by the Lamm patent, bearing assemblies in which two ball complements are preloaded with opposing thrust components typically comprise inner races fixed against axial displacement on a shaft in the direction of the thrust component imparted by their respective ball complements and outer races mounted in a housing with some sort of spring means urging the outer races toward or away from each other. Such bearing assemblies, as exemplified by the Lamm patent, are generally complicated and expensive assemblies due largely to the multiplicity of parts, many of which require accurate machining and extensive grinding operations.

The object of this invention is to provide a simple, inexpensive bearing assembly having two ball complements which are preloaded with opposing thrust components.

Another object of this invention is to provide such a bearing assembly which makes extensive use of inexpensive stamped sheet metal parts and minimizes the use of parts which require accurate machining and extensive grinding operations typically referred to as hardened and ground parts.

Another object of this invention is to provide such a bearing assembly which uses relatively few parts in comparison to known bearing assemblies of the same general type.

Yet another object of this invention is to provide such a bearing assembly which requires only a hardened and ground shaft, bearing balls, two sheet metal separators and two stamped sheet metal parts.

Yet another object of this invention is to provide such a bearing assembly which is easily sealed.

Still another object of this invention is to provide a bearing assembly in which the ball complements are preloaded as an incidence of assembly one of the ball complements into a cooperative association with its raceways.

Yet another object of this invention is to provide such a bearing assembly which facilitates and simplifies the assembly procedure.

Still another object of this invention is to provide a bearing assembly having two ball complements in which the ball complements are preloaded as an incidence of incorporating the last ball complements into the assembly.

Yet still another object of this invention is to provide a bearing assembly having two preloaded ball complements in which all essential components are held in assembly by the balls themselves without the requirement for bolts, screws, fasteners and the like.

Other objects and features of this invention will become apparent to those skilled in the art as the disclosure is made in the following detailed description of a preferred embodiment of the invention as illustrated in the accompanying sheet of drawing wherein.

Figure 1:
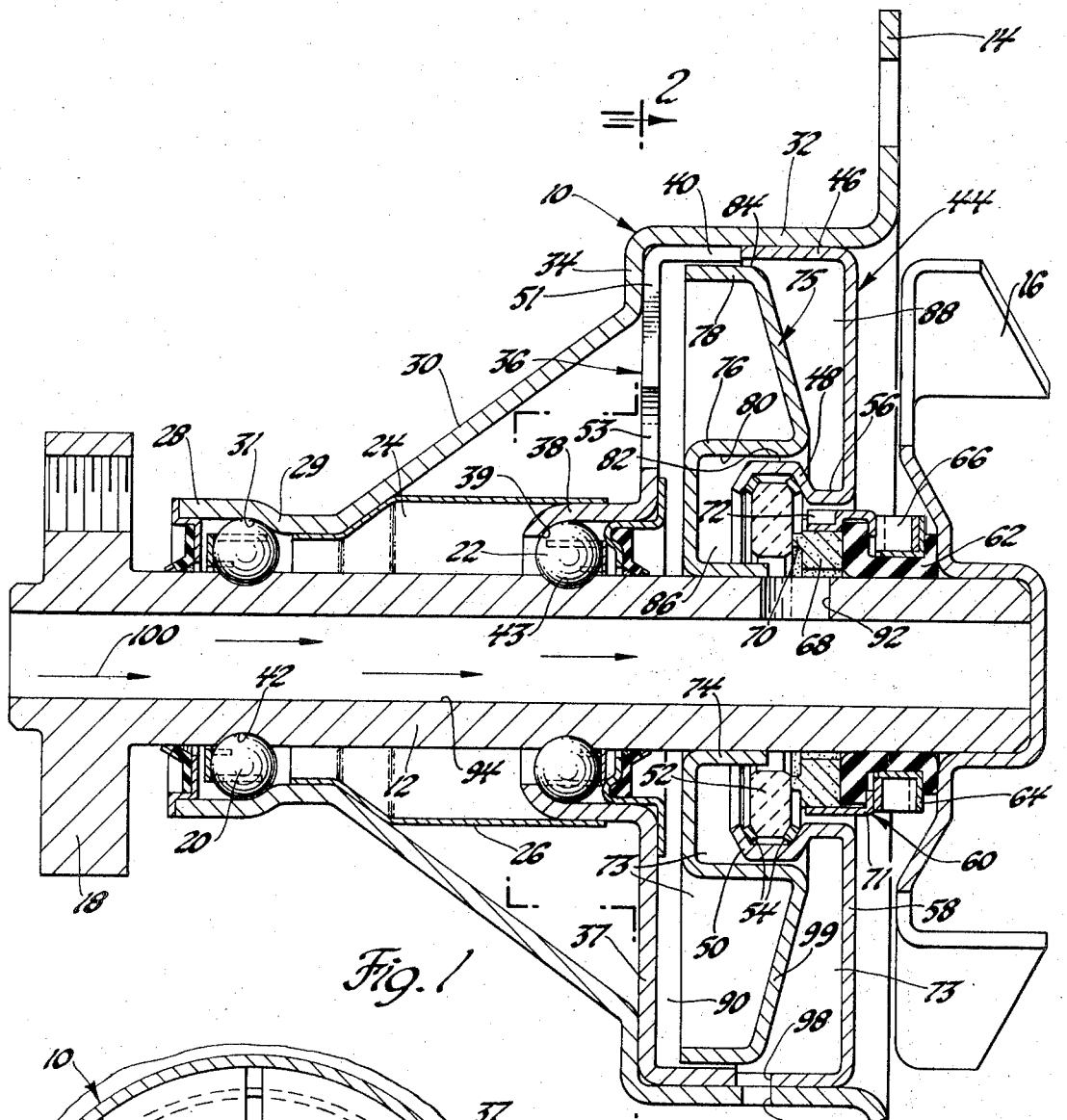
FIG. 1 is an axial section through an automotive waterpump subassembly which includes an axially preloaded bearing assembly in accordance with my invention.

Referring now to the drawings, the automotive waterpump subassembly comprises a stamped sheet metal housing 10 which rotatably supports a hollow impeller drive shaft 12. The housing 10 has an outward mounting flange 14 at the right end for connecting the housing 10 to an engine block (not shown) such that the impeller 16 carried on the right end of the shaft 12 is disposed in a water jacket in the engine block for recirculating water through the cooling system of the engine. An integrally formed flange 18 at the left end of the shaft 12 provides a connection means for a drive pulley (not shown) which is belt driven by the engine.

The hollow impeller drive shaft 12 is rotatably mounted by a pair of axially spaced bearing ball complements 20 and 22 located in a sealed bearing chamber 24 in the housing 10. The sheet metal housing 10 has a smaller diameter cylindrical end portion 28 and a contiguous necked portion 29 which forms an outer angular contact raceway 31 located to the interior side of the ball complement 20 which it engages. The necked portion 29 in turn is contiguous with a conical portion 30 connected to a larger diameter cylindrical end portion 32 by a short radial wall portion 34. The outwardly extending flange 14, by which as previously mentioned the housing 10 is secured to the engine, is at the end of the larger diameter end portion 32.

A stamped sheet metal wall plate 36 having a generally radial wall 37 with oppositely extending flanges 38 and 40 at its inner and outer peripheries respectively is disposed in the larger diameter cylindrical end portion 32 of the housing 10 against the short radial wall 34. The free end of the inner flange 38 is curved radially inwardly forming an angular contact raceway 39 located to the interior side of the bearing ball complement 22 which it engages. The bearing ball complements 20 and 22 run in full ball grooves 42 and 43 formed in the outer surface of the shaft 12. If desired, bearing inserts of wear resistant material covering the angular contact raceways 31 and 39 may be provided for the ball complements 20 and 22 to roll on. As illustrated, the ball complements 20 and 22 have sheet metal separators of the axially insertable type, although any type of separator can be used for the ball complement 20 and any type of separator which can be assembled into an operative relationship with the ball complement 22 after the ball complement is disposed in the raceways 31 and 39 can be used for the ball complement 22.

In its assembled position, the inner end of the generally radial wall 37 of the wall plate 36 is resiliently deformed toward the smaller diameter portion 28 of the housing 10 and thus the wall plate 36 acts as a spring urging the angular contact raceways 31 and 39 away from each other. This spring action preloads the ball complements 20 and 22 in the axial direction with opposing thrust forces thereby eliminating end play between the hollow impeller drive shaft 12 and the housing 10. The reaction forces are taken by the short radial wall portion 34 of the housing 10 with the reaction forces serving to effect a good seal therebetween.

Figure 2:
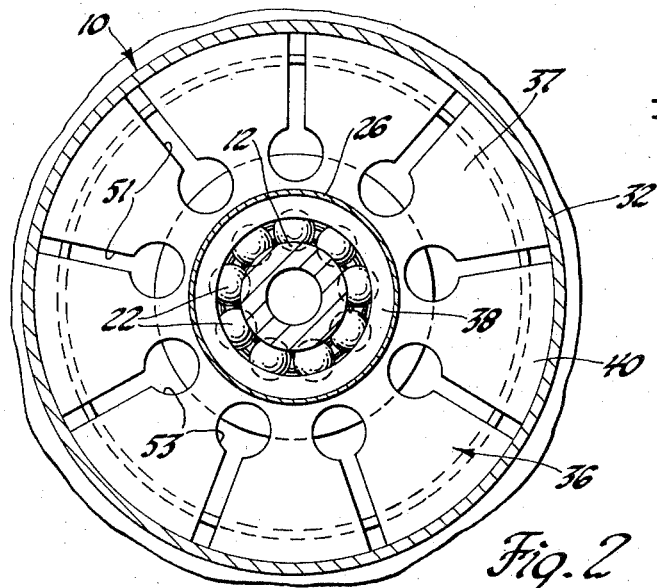
FIG. 2 is a section taken substantially along the line 2—2 of FIG. 1.
Figure 3:
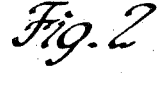
FIG. 3 is an axial section through the wall plate shown in FIG. 1 showing the wall plate in its free unflexed state prior to assembly into the waterpump subassembly.

If desired, the spring rate of the wall plate 36 may be adjusted, as for instance, by slotting the radial wall 37 of the wall plate 36 as best illustrated in FIG. 2. As shown in FIG. 2, the wall plate 36 has a plurality of radial slots 51 extending from its outer margin to circular holes 53 radially spaced from the inner flange 38. While nine circumferentially spaced slots 51 with enlarged holes 53 are shown, the number and size of the slots 51 and holes 53 can be varied to provide any desired spring rate for the wall plate 36. The wall plate 36 may be more easily formed by first punching the slots and holes in a flat plate. This facilitates forming the flanges 38 and 40 especially if the slots 51 extend through the outer flange 40.

As previously mentioned, the ball complements 20 and 22 are located in a sealed bearing chamber 24. The sealed bearing chamber is located to the left of the radial wall on the wall plate 36 and comprises a thin tube 26 necked down at one end which tightly engages against the inner surface of the conical portion 30 and the necked portion of the smaller diameter portion 28 of the housing 10. The other end of the tube 26 engages the outer surface of the inner flange 38 on the wall plate 36 with a slip-fit. The purpose for this slip-fit will be explained later. In those instances where it is not necessary to slot the wall plate 36 for adjusting the spring rate or to otherwise make the wall plate impervious, the tube 26 may be eliminated and the bearing chamber can extend to the inner surface of the conical portion 30 of the housing 10 since the reaction forces between the outer periphery of the wall plate and the short radial portion 34 on the housing effects a good seal therebetween.

Conventional bearing seals having an elastomeric sealing lip engaging the impeller drive shaft 12 are mounted on the left end of the housing 10 and the wall plate 36 completing the closure for the sealed bearing chamber 24 in which the bearing ball complements 20 and 22 are housed. The conventional seals in some instances may be replaced by shields having inner edges spaced closely to the shaft depending to an extent on the type of lubricant in the bearing chamber 24 which is normally filled with grease.

A stamped sheet metal annular end plate 44 has an outer flange 46 press fitted into the larger diameter cylindrical end portion 32 of the housing 10 with its end face abutting the end face of the outer flange 40 of the wall plate 36. The end plate 44 also has an inner sleeve portion 48 extending toward the wall plate 36 with an enlarged free end 50 tightly embracing the beveled outer margin of a ceramic face seal element 52 through interposed conical washers 54 of a soft ductile material such as copper or aluminum. The enlarged free end 50 securing the ceramic face seal element 52 imparts a compressive stress thereto in the circumferential direction with the washers 54 being deformed to effectuate a good seal therebetween. The neck between the enlarged free end 50 and the radial wall 58 of the sheet metal end plate 44 form a trough 56, the advantage of which will be explained later.

A cooperating face seal assembly indicated generally at 60 comprises a channel shaped elastomeric friction ring 62 mounted on the hollow shaft 12 in tight sealing engagement therewith. An L-shaped sheet metal spring holder 64 and wave spring 66 are disposed in the channel of the friction ring 62. A carbon face seal 68 having an annular sealing ridge 70 is slidably disposed in a shell 71 secured to the inboard end of the channel shaped elastomeric ring 62. Indents 72 in the shell 71 cooperate with scallops in the periphery of the carbon face seal preventing relative rotation therebetween. The wavy spring 66 biases the annular sealing ridge 70 of the carbon face seal 68 into sealing engagement with the ceramic face seal element 52 carried by the end plate 44.

The wall plate 36 and the end plate 44 form a chamber 73 within the sheet metal housing 10. Disposed within the chamber 73 is an annular stamped sheet metal baffle 75 of a generally S-shaped configuration having inner, intermediate and outer axial portions 74, 76 and 78 respectively. The inner axial portion 74 is press fitted on the impeller drive shaft 12 for rotation therewith. The intermediate axial portion 76 has an inner circumferential surface 80 which is spaced closely adjacent an outer circumferential surface 82 on the sleeve 48 of the end plate 44 so as to impede the flow of fluid and the passage of dirt and other deleterious matter therebetween. Similarly, the outer axial portion 78 of the baffle 75 has an outer circumferential surface 84 spaced closely adjacent the flange 40 on the wall plate 36 forming part of a circumferential surface of the chamber 73 so as to impede the flow of fluid and the passage of dirt and the like therebetween. While it is preferable from a sealing standpoint to have the flange 40 continuous, as pointed out previously, the flange 40 may be discontinuous for ease of forming, however even in this instance, the proximity of a discontinuous flange impedes the flow of fluid and the passage of dirt and the like. Thus the chamber 73 is partitioned by the baffle plate 75 into an outer compartment 86, an intermediate compartment 88 and an inner compartment 90. The compartment 90 opens into the interior of the conical portion 30 of the housing 10 through the slots 51 and holes 53, however, the bearing chamber 24 is sealed from anything passing therethrough by virtue of the tube 26.

The impeller drive shaft 12 has one or more radial bores 92 aligned with the interface between the ceramic seal element 52 and the carbon face seal 68 and thus the outer compartment 86 communicates directly with the axial bore 94 of the hollow impeller drive shaft 12. The axial bore 94 is open at the left end protruding from the housing 10 but the right end of the bore 94 which is located in a water filled pump chamber when the waterpump impeller assembly is attached to an engine is closed by the sheet metal impeller 16 which is press fitted on the right end of the shaft by a central cup portion. Thus there is provided a drainage path from the outer chamber 86 to the outside of the housing 10. A slot 96 in the bottom of the larger diameter cylindrical end portion 32 of the housing 10 and matching slot 98 in the flange 46 provide drainage from the intermediate chamber 88. Preferably the radial portion 99 connecting the axial portions 76 and 78 of the baffle plate is frusto-conical slanting outwardly toward the wall plate 36 with its outer margin in axial alignment with the slots 96 and 98 forming a drainage for the intermediate chamber 88.

The sealing arrangement operates as follows. When the waterpump impeller subassembly is operatively assembled to an engine block, the impeller 16 is located in the water filled pump chamber of the engine which means there is water present at the right face of the end plate 44 and stationary ceramic face seal element 52. The interior of the housing 10 is sealed from the water in the first instance by the ridge 70 on the carbon face seal 68 which is biased into sealing engagement with the ceramic face seal element 52 by the wave spring 66. However, it is virtually impossible under normal operating conditions to prevent some water from leaking past the seal interface. In fact, under dynamic conditions, the leakage of a small amount of water is needed to lubricate the rubbing surfaces of the ceramic face seal element 52 and the carbon face seal element 68. The leakage water is disposed of and prevented from reaching the bearing ball complements 20 and 22 in the following manner. Any water leaking past the seal interface between the seal elements 52 and 68 is received in chamber 86 from whence it passes through the radial bore 92 and out through the open end of the axial bore 94 of the hollow impeller drive shaft 12 to the atmosphere. Since this drainage path is relatively large compared to the clearance between the intermediate axial portion 76 of the baffle plate 75 and the sleeve portion 48 of the end plate 44, the water follows this path in preference to entering the intermediate chamber 88 because the small clearance offers a much higher impedance to the flow of fluid through the clearance. Moreover, the radial bore 92 and axial bore 94 provide an overflow capable of handling excessive leakage past the face seal interface. In the event that some portion of the leakage water should pass into the intermediate chamber 88, it will drain out of the intermediate chamber 88 through the aligned slots 96 and 98. In this regard, it should be noted that baffle plate 75 and end plate 44 are configured to promote drainage from the intermediate compartment 88. Water collecting in the upper half of the intermediate chamber 88 or flowing along the upper half of the sleeve 48 is directed into the trough 56 from whence it is directed downwardly toward the aligned drainage slots 96 and 98. The conical portion 99 on the rotating baffle plate 75 funnels water in the upper half of the intermediate compartment 88 toward the trough 56 and water in the lower half toward the aligned drainage slots 96 and 98.

A second high impedance to the flow of water or water vapor toward the bearing is provided by the close clearance between the outer axial portion 78 of the baffle plate 75 and the flange 40 of the wall plate 36. Finally, should the water possibly pass both of these high impedance barriers, the bearing chamber 24 is still protected by the bearing seal mounted in the flange 38 and the tube 26.

These two high impedance barriers permit a much larger drainage slot in the housing 10 than was heretofore possible. This is because during static conditions and even more so during dynamic conditions when the impeller 16 is rotating, the high impedance barrier between the outer axial portion 78 on the baffle plate 75 prevents dirt and the like from entering into the compartment 90 via the drainage slot and the high impedance barrier between the intermediate axial portion 76 and the sleeve portion 48 prevents dirt and the like from entering the compartment 86 and reaching the face seal elements 52 and 68.

Under dynamic conditions, the rotating baffle plate 75 acts somewhat like a fan which tends to induce an air flow in the direction indicated by the arrows 100. This induced air flow expels any water and dirt which may have collected in the hollow drive shaft 12, the compartment 86, or the compartment 88 through the aligned drainage slots 96 and 98 thus providing a self-cleaning feature.

The manner in which the housing 10, wall plate 36, shaft 12, ball complements 20 and 22 and their separators are assembled to preload the ball complements 20 and 22 is as follows. The hollow impeller drive shaft 12, the housing 10 and the ball complement 20 are first assembled into an operative relationship. This may be done by the well known Conrad assembly method in which the shaft 12 is disposed eccentrically within the housing to form an enlarged crescent shape space between one side of the shaft 12 and the housing 10 which permits a given number of balls to be inserted into the raceway 42 in a generally axial direction from the left end of the housing 10. These balls are then circumferentially spaced forming the ball complement 20 which centers the left end of the shaft 12 in the housing. The balls in the ball complement 20 are maintained circumferentially spaced by a separator which may be of the type shown in the drawing which comprises a single end ring with spring fingers which snap over the balls when the separator is inserted axially into position from the left end of the housing 10. Alternatively the ball complement 20 may first be assembled into the ball groove 42 and maintained circumferentially spaced by any type of separator and then the assembled shaft 12, ball complement 20 and separator inserted axially into the housing 10 from the left end. The important feature is that the ball complement 20 is assembled into its operative relationship with the housing 10 and shaft 12 before the ball complement 22 is so assembled. The wall plate 36 is inserted into the right end of the housing against the short radial wall 34 either before or after the operative assembly of the ball complement 20. In its free state prior to insertion, the radial wall 37 on the wall plate 36 is preferably slightly frusto-conical and slants radially inwardly toward the free end of the flange 40. In practice, the slant is very small on the order of a few degrees. Preferably the flange 40 is also flared outwardly a few degrees and has a maximum diameter at its free end which exceeds by the inner diameter of the larger diameter portion 32 of the housing 10 by a few thousandths of an inch so that after insertion, the wall plate 36 is centered in the housing 10 while permitting a small radial adjustment against the bias of the flange 40.

After insertion of the wall plate 36, the inner margin of the radial wall 37 on the wall plate 36 is resiliently deflected toward the small diameter end of the housing 10. While the radial wall 37 is maintained deflected, the drive shaft 12 is pivoted on the bearing complement 20 radially offsetting the inner race 39 from the axis of the housing 10 so as to form an enlarged crescent shape opening between the drive shaft 12 and the flange 38. A given number of bearing balls are then inserted generally axially into the full raceway groove 43. These balls are then circumferentially spaced and so maintained by an axially inserted separator thus centering the hollow drive shaft in the housing 10 at this second location. After the balls in the ball complement 22 are circumferentially spaced, the inner margin of the radial wall 37 of the wall plate 36 is released. Upon release, the wall plate 36 is prevented from returning to its original free unflexed condition by the ball complements 20 and 22 thus producing a spring action which urges the angular contact raceway 39 away from angular contact raceway 31 and preloads the ball complements 20 and 22. When thus resiliently deflected, the initial slant of the radial wall 37 is flattened at the outer margin providing a relatively wide flat engagement with the radial wall 34 of the housing 10. In those instances where the wall plate 36 is slotted and a sealed bearing is desired, the tube 26 may be utilized. This tube 26 would be inserted into the housing 10 against the conical portion 30 prior to insertion of the wall plate 36. As previously mentioned, the tube 26 has a slip-fit on the inner flange 38 of the wall plate 36. This is to permit the subsequent deflection of the inner margin of the radial wall 37 toward the small diameter portion 28 of the housing 10 during the assembly of the ball complement 22.

I wish it to be understood that I do not desire to be limited to the exact details of construction shown and described, for obvious modifications will occur to a person skilled in the art.

What is claimed is:

1. An axially preloaded bearing assembly comprising, a one-piece generally annular sheet metal housing having a smaller diameter end portion, a larger diameter end portion, a necked portion located between said smaller diameter end portion and said larger diameter end portion forming a first angular contact raceway, and a thrust wall portion located between said necked portion and said larger diameter end portion, a one-piece generally annular sheet metal plate having a lateral resilient generally radial wall and an axially disposed continuous inner flange, said plate being disposed in said larger diameter end portion of said housing with the outer margin of said generally radial wall abutting said thrust wall portion of said housing, said inner flange having an inwardly curved portion forming a second angular contact raceway facing in the opposite direction of said first angular contact raceway, a shaft coaxially disposed in said housing, said shaft having first and second axially spaced full groove inner raceway means thereon, and first and second complements of circumferentially spaced bearing balls disposed in said first and second inner raceway means respectively, said first and second complements of bearing balls imparting oblique forces to said first and second angular contact raceways respectively which converge in the radially outward direction, said generally radial wall of said sheet metal plate being laterally resiliently deflected and urging said first and second angular contact raceways away from each other to preload said bearing ball complements.

2. An axially preloaded bearing assembly comprising, a one-piece generally annular sheet metal housing having a smaller diameter end portion, a larger diameter end portion, a necked portion located between said smaller diameter end portion and said larger diameter end portion forming a first angular contact raceway in said housing, and a generally radial wall portion located between said necked portion and said larger diameter end portion and contiguous with said larger diameter end portion, a one-piece generally annular sheet metal plate having a lateral resilient generally radial wall, an axially disposed continuous inner flange and an axially disposed outer flange extending in opposite directions from said generally radial wall, said plate being disposed in said larger diameter end portion of said housing with the outer margin of said generally radial wall abutting said generally radial wall portion of said housing and said outer flange engaging the inner surface of said larger diameter end portion, said inner flange having an inwardly curved portion forming a second angular contact raceway facing toward said larger diameter end portion, a shaft coaxially disposed in said housing, said shaft having first and second axially spaced full groove inner raceway means thereon, and first and second complements of circumferentially spaced bearing balls disposed in said first and second inner raceway means respectively, said first and second complements of bearing balls imparting oblique forces to said first and second angular contact raceways respectively which converge in the radially outward direction, said generally radial wall of said sheet metal plate being laterally resiliently deflected and urging said first and second angular contact raceways away from each other to preload said bearing ball complements.

3. An axially preloaded bearing assembly comprising, a one-piece generally annular sheet metal housing having a smaller diameter cylindrical end portion, a larger diameter cylindrical end portion, a necked portion located between said smaller diameter cylindrical portion and said larger diameter cylindrical end portion forming a first angular contact raceway in said housing contiguous with the internal surface of said smaller diameter cylindrical end portion at its maximum diameter, and a generally radial wall portion located between said necked portion and said larger diameter cylindrical end portion and contiguous with said larger diameter cylindrical end portion, a one-piece generally annular sheet metal plate having a lateral resilient generally radial wall, an axially disposed continuous inner flange and an axially disposed outer flange extending in opposite directions from said generally radial wall, said generally radial wall having a plurality of radial slots extending to its outer periphery, said outer flange having axially disposed slots extending from end to end of said outer flange and aligned with said radial slots in said radial wall, said plate being disposed in said larger diameter cylindrical end portion of said housing with the outer marginal portion of said generally radial wall abutting said generally radial wall portion of said housing and said outer flange engaging the inner surface of said larger diameter cylindrical end portion with a slight radial bias, said inner flange having an inwardly curved portion forming a second angular contact raceway facing toward said larger diameter cylindrical end portion, a shaft coaxially disposed in said housing, said shaft having first and second axially spaced full groove inner raceways on its outer periphery, and first and second complements of circumferentially spaced bearing balls disposed in said first and second inner raceways respectively, said first and second complements of bearing balls engaging said first and second angular contact raceways respectively, said generally radial wall of said sheet metal plate being laterally resiliently deflected and urging said second angular contact raceway away from said first angular contact raceway to preload said bearing ball complements.

4. The axially preloaded bearing assembly defined in claim 3 further comprising a tube disposed in said housing, said tube having a necked end engaging an internal surface of said necked portion of said housing with a press fit and another end engaging an outer circumferential surface on said inner flange of said plate with a slip fit, first seal means for closing an annular space between said shaft and said smaller diameter portion outboard of said first bearing ball complement, and second seals means for closing an annular space between said shaft and said inner flange on said plate outboard of said second bearing ball complement whereby said bearing ball complements are in a sealed bearing chamber.

* * * * *